US012584607B2

(12) United States Patent
Baetz et al.

(10) Patent No.: US 12,584,607 B2
(45) Date of Patent: Mar. 24, 2026

(54) ILLUMINATION UNIT HAVING AN ANTIFOGGING SYSTEM

(71) Applicant: FORD GLOBAL TECHNOLOGIES, LLC, Dearborn, MI (US)

(72) Inventors: Andre Baetz, Grevenbroich (DE); Tobias Martens, Cologne (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 18/970,283

(22) Filed: Dec. 5, 2024

(65) Prior Publication Data

US 2025/0189098 A1 Jun. 12, 2025

(30) Foreign Application Priority Data

Dec. 6, 2023 (DE) ........................ 102023134203.7

(51) Int. Cl.
*F21S 45/43* (2018.01)
*F21W 103/00* (2018.01)

(52) U.S. Cl.
CPC .......... *F21S 45/43* (2018.01); *F21W 2103/00* (2018.01)

(58) Field of Classification Search
CPC ..... F21S 45/43; B62D 33/023; B62D 33/027; B62D 33/0273; B62D 33/0276; B62D 33/03; B62D 33/033; B62D 33/0377
USPC ........................................ 362/547, 294, 373
See application file for complete search history.

(56) References Cited

U.S. PATENT DOCUMENTS

| | | | | |
|---|---|---|---|---|
| 10,576,935 | B2 | 3/2020 | Sammarome et al. | |
| 10,753,571 | B2 * | 8/2020 | Schubert | F21S 45/37 |
| 2007/0127257 | A1 * | 6/2007 | Erion | F21V 29/677 362/547 |
| 2015/0217685 | A1 * | 8/2015 | Salter | H05B 47/115 362/485 |
| 2024/0140316 | A1 * | 5/2024 | Ebanks | B60Q 1/0088 |

FOREIGN PATENT DOCUMENTS

| | | | |
|---|---|---|---|
| CN | 211526340 | U | 9/2020 |
| DE | 102015002246 | B4 | 8/2017 |
| JP | 2007335292 | A | 12/2007 |

* cited by examiner

*Primary Examiner* — Thomas M Sember
(74) *Attorney, Agent, or Firm* — Vichit Chea; Carlson, Gaskey & Olds, P.C.

(57) ABSTRACT

The disclosure relates to an illumination unit, in particular an elongated illumination unit, on the outside of a motor vehicle, comprising a housing having at least one light emission opening which is closed by a light-transmissive cover plate, wherein the housing has two end regions, arranged in which in each case is an illumination assembly having at least one light source that is designed to emit light through the cover plate. In a rear housing wall, i.e., in a rear wall of the housing, between the two end illumination assemblies are arranged at least one air inlet opening and, separate therefrom, at least one air outlet opening, wherein the air inlet opening is connected to the vehicle interior of the motor vehicle, whereas the air outlet opening is connected to an outer area of the motor vehicle. This establishes during operation of the motor vehicle an automatic air circulation in the interior of the housing from the air inlet opening to the air outlet opening that is brought about by a pressure difference between vehicle interior and outer area of the motor vehicle.

20 Claims, 3 Drawing Sheets

ILLUMINATION UNIT HAVING AN ANTIFOGGING SYSTEM

CROSS-REFERENCE TO RELATED APPLICATION

This application claims priority to German Application No. DE 10 2023 134 203.7, which was filed on Dec. 6, 2023 and is incorporated herein by reference in its entirety.

TECHNICAL FIELD

This disclosure relates to an illumination unit in the form of an elongated illumination unit on the outside of a motor vehicle according to the preamble of Claim 1, including a housing having at least one light emission opening which is closed by a light-transmissive cover plate, wherein the housing has two end regions, arranged in which in each case is an illumination assembly having at least one light source that is designed to emit light through the cover plate.

BACKGROUND

In newer motor vehicle models, LED lights are increasingly being used as light sources in external illumination units. They can be used for taillights and brake lights, but also for high beam, low beam, turn signals or daytime running lights. LED lights are often brighter, more energy-efficient and longer-lasting than, for example, halogen lamps.

LED technology also allows more freedom when designing the individual illumination assemblies and their connection to each other. For example, it is possible to provide functional illumination which connects the illumination assemblies of a motor vehicle to each other over the entire width or height of the motor vehicle rear or tailgate, often referred to as "coast-to-coast" or central light strip.

Such a coast-to-coast illumination unit optically connects, for example, the rear lights at the rear of a motor vehicle to each other, and so the corresponding illumination unit has an elongated, hollow illumination housing or illumination body, in the end regions of which the respective illumination assemblies are accommodated. The elongated illumination housing extends, for example, over the entire width of a tailgate and is, with its end regions, especially adjacent to further illumination units in the vehicle body, i.e. in the fender for example, thus often optically forming a unit together with the illumination units. In other embodiments, the illumination is entirely on the tailgate. In the central region of the illumination unit, it is furthermore possible to provide further illumination devices, examples being a dynamic LED light band and/or illuminated lettering. The region between the ends may, however, also be nonilluminated.

Although exterior illumination bodies can be sealed against the ingress of water, they cannot be completely sealed against the outside environment, since air expansion must be ensured because of the heat generated during operation. In general, the ambient air contains gaseous water, and so too does the interior of the lights. At lower temperatures, the gaseous water in the at least partially transparent illumination body becomes liquid and forms a visible film with fogging of the illumination unit, which is usually perceived by the motor vehicle user as a quality issue. The liquid water film is even more visible in the case of lights which appear black and have clear outer lenses.

Therefore, various solutions for preventing fogging of transparent exterior surfaces are already known for individual illumination units. For example, JP 2007-335 292 A discloses a system for lights of a motor vehicle that is intended to prevent fogging of the lights, including fogging of rear lights. To this end, a line opening in the rear light is routed thereto from the vehicle interior. The air flows past the bulb and the reflector to a waste air duct.

By contrast, U.S. Pat. No. 10,576,935 B2 discloses a motor vehicle having headlights that are fluidically connected to an air conditioning system for supplying an air flow thereto. The overall system comprises an electric fan for generating the air flow, an electric heater for heating the air flow generated by the electric fan, a sensory system for measuring the air temperature and the moisture inside the headlights, an electric heater and an electric fan arranged inside each headlight, and an electronic control unit connected to the sensory system to receive the measured quantities. The system is controlled by the measured quantities, which means a highly complex process with multiple additional components.

DE 10 2015 002 246 B4 likewise discloses an illumination device for a motor vehicle that is connected to an air conditioning system to prevent fogging.

CN 211 526 340 U likewise discloses an antifogging system for a motor vehicle headlight. The motor vehicle headlight consists of a lamp housing, a lampshade and light-emitting units. One light-emitting unit (LED light) further comprises an air inlet tube, an air guide tube and a ventilation cap, wherein the air inlet tube is installed outside the lamp housing, the air inlet tube is connected to one end of the air guide tube, the air guide tube is arranged in the lamp housing, the other end of the air guide tube is routed into the inner surface of the lampshade, and the ventilation cap is arranged on the lamp housing. The air flow is conducted from the outside through the air inlet tube and the air guide tube into the inner surface of the lampshade and then flows out of the ventilation cap to form a continuously flowing air flow, and the inner surface of the lampshade is dehumidified and rendered fog-free.

However, there are still no known solutions for the described coast-to-coast illumination units and, in view of the prior art shown, this field still offers room for improvement.

It is therefore an object of this disclosure to provide an improved coast-to-coast illumination unit in which externally visible fogging can be prevented or reduced and can be dispersed by simple means without great effort.

SUMMARY

According to this disclosure, the object is achieved by an illumination unit in the form of an elongated illumination unit having the features of Claim 1. Further particularly advantageous refinements of the disclosure are disclosed in the dependent subclaims.

It should be noted that the features and measures specified individually in the following description can be combined with one another in any desired technically meaningful way and disclose further refinements of the disclosure. The description additionally characterizes and specifies the invention, in particular in conjunction with the figures.

The illumination unit according to this disclosure is an elongated illumination unit on the outside of a motor vehicle. "Elongated" within the context of this disclosure means that, in the vehicle coordinate system, the illumination unit is many times longer in one extension direction (y-direction) than in the other two extension directions (x/z-direction). Here, the y-direction in the vehicle coordinate system runs along the vehicle transverse axis, the x-direction in the direction of travel and the z-direction along the vehicle vertical axis. The illumination unit includes a housing having at least one light emission opening which is closed by a light-transmissive cover plate. The housing is thus likewise elongated and has two end regions, arranged in which in each case is an illumination assembly having at least one light source that is designed to emit light through the cover plate.

The illumination unit is, for example, mounted in the rear region of a motor vehicle, and light of the at least one light source emits rearward from the housing through the light emission opening. The illumination unit may be in the form of a tailgate illumination unit on the motor vehicle that extends in the y-direction over the entire tailgate width and forms together with illumination units on the vehicle body a so-called coast-to-coast illumination unit. “Tailgate” within the context of this disclosure also includes a trunk lid, or a door to be opened or closed about a vertical swivel axis.

An illumination assembly of such an illumination unit may include, for example, a taillight, a rear fog light and a reversing light, and may be adapted to form lateral side marker lights or lateral rear lights. The at least one light source of an illumination assembly works, for example, according to the principle of reflection and includes a light source and a reflector. If, by contrast, the light source works according to the principle of projection, there are further provided a projection lens and an aperture arrangement. Theoretically, a conventional incandescent lamp or a gas discharge lamp can be used as the light source, but preference is given to one or more light-emitting diodes (LEDs).

According to the disclosure, in a rear housing wall between these two end illumination assemblies are provided at least one air inlet opening and, separate therefrom, at least one air outlet opening, wherein the air inlet opening is connected to the vehicle interior of the motor vehicle, whereas the air outlet opening is connected to an outer area of the motor vehicle. This establishes during operation of the motor vehicle an automatic air circulation in the interior of the housing from the air inlet opening to the air outlet opening, characterized in that it is brought about by a pressure difference between vehicle interior and outer area of the motor vehicle.

According to the disclosure, it is thus proposed that air from the vehicle interior of the motor vehicle flows through the housing of the illumination unit such that dehumidification and demisting of the light-transmissive cover plate is achieved with certainty and in a reliable manner. Preferably, the air from the interior is heated to this end. The pressure difference required for the air flow is, however, not generated by additional devices such as fans; instead, during operation of the motor vehicle with doors and windows closed, a positive pressure usually forms in relation to the environment and this brings about a sufficiently large air flow. The pressure difference between vehicle interior and outer area of the motor vehicle is brought about, for example, by the operation of an air conditioning system in the vehicle interior. This means that moisture is additionally removed from the air entering the housing of the illumination unit, and so the air can be used particularly advantageously for dehumidification of the illumination unit. Alternatively, or additionally, a pressure difference can also be brought about by forward motion of the motor vehicle. “Operation of the motor vehicle” can therefore cover various states in which different functional components of the motor vehicle are in operation and capable of generating a positive pressure in the vehicle interior. For example, the air conditioning system of a motor vehicle may also be operated when there is no forward motion of the motor vehicle.

This pressure difference is, for example, about 20 Pa in one exemplary embodiment. In practical tests, such a pressure difference led to an air flow of about 4.5 liters/min, which sufficed for satisfactory dehumidification. For example, dehumidification was thus achieved within about 15 minutes in practical tests. The size of the air inlet and air outlet openings is appropriately selected such that the incoming air flow is sufficiently large, but without especially the air outlet opening, which is connected to the outer area, being so large that it allows an excessively large and unwanted ingress of moisture. Opening sizes in the order of about 2-20 $mm^2$, preferably about 3-10 $mm^2$, have been found to be advantageous.

The air inlet opening may be connected to the vehicle interior via ducts and/or hoses, whereas the air outlet opening is connected to the outer area via ducts and/or hoses. In the disclosed unit however, a direct air interface is established between the housing, i.e. preferably the rear housing wall of the illumination unit, and the vehicle interior. For example, the inner face of the tailgate is directly adjacent to the vehicle interior and the air interface can be realized with few aids.

Furthermore, according to one exemplary embodiment, the air at the air inlet opening and/or the air outlet opening flows through a ventilation element having a membrane. Such ventilation elements are especially provided to allow pressure equalization in both directions by means of their membrane, to protect the interior of the illumination unit from contaminants (e.g. dust, insects, etc.) and to prevent ingress of moisture. For example, ventilation elements having a membrane made of ePTFE (polytetrafluoroethylene) or PET (polyethylene terephthalate) have been found to be useful for this purpose. Membranes made of the material PET have been found to be particularly advantageous because they allow a high air flow rate. Thus, a connection between illumination unit and vehicle interior/outer area can be advantageously used without, in an ideal refinement, causing soiling within the illumination unit.

If more than one air inlet opening and/or more than one air outlet opening are provided, they can be suitably arranged so that an air flow is still automatically established. It is within the scope of this disclosure an embodiment in which air inlet openings are not arranged directly next to air outlet openings. In a refinement, they have maximum possible spacing in the transverse direction.

In one embodiment, in the housing of the elongated illumination unit between the at least one air inlet opening and the at least one air outlet opening is provided at least one further central illumination assembly, past which the automatic air circulation flows along the inner face of the light-transmissive cover plate. The central illumination assembly forms, for example, an LED light band or illuminated lettering.

The air circulation may be formed in the interior of the housing of the illumination unit such that it flows along the inner face of the light-transmissive cover plate. To this end, guide structures for specific guidance of the air flow of the air circulation may be provided in the interior of the housing. Alternatively or additionally, the air flow enters the housing of the illumination unit in an advantageous direction. Preferably, the direction thereof is preferably not perpendicular to the inner face of the cover plate, but diagonal thereto. The at least one air inlet opening can be appropriately designed to direct the air flow into the desired direction.

The air inlet and air outlet openings are located in the rear housing wall, i.e. preferably on the back of the illumination unit opposite the light emission opening, i.e. in the rear wall. The illumination unit is mounted on the vehicle via the back/rear wall, and air also enters or exits from this side. The arrangement of the at least one air inlet and air outlet opening is chosen such that the air circulation flows through a maximum number of critical regions within the housing. However, account must be taken in particular of the other components, such as illumination assemblies, connections, braces, etc., within the housing, and the openings are arranged with attention being paid thereto. It is expedient within the context of this disclosure if the openings are arranged between the two end illumination assemblies, but at the widest possible distance relative to each other in order to realize the greatest possible air circulation.

Therefore, for example, according to one embodiment, the at least one air inlet opening and the at least one air outlet opening are arranged at a maximum distance $\Delta y$ to each other in the y-direction of the motor vehicle, taking into account the other components within the housing. As a result of this, the air flow covers as far a distance as possible in the housing, which in turn leads to the greatest possible air circulation. Furthermore, the air flow can absorb as much moisture as possible and, if applicable, release heat, which speeds up the removal of condensed liquid from the cover plate.

According to a further embodiment, the at least one air inlet opening and the at least one air outlet opening are arranged at different heights in the z-direction of the motor vehicle. Preferably, the at least one air inlet opening is arranged above the at least one air outlet opening, i.e. higher. The inventors have found that the weight of the air increases as a result of the absorption of moisture and then flows more easily out of the lower air outlet opening.

Preferably, the at least one air inlet opening and the at least one air outlet opening are arranged relative to each other at a maximum height difference $\Delta z$, taking into account the other components within the housing. The greatest possible height difference is thus expediently achieved.

BRIEF DESCRIPTION OF THE DRAWINGS

Further advantageous refinements of the invention are disclosed in the subclaims and in the following description of the figures. In the figures:

In the different figures, identical parts are always provided with the same reference signs, for which reason these parts are generally also described only once.

DETAILED DESCRIPTION

Figure 1:
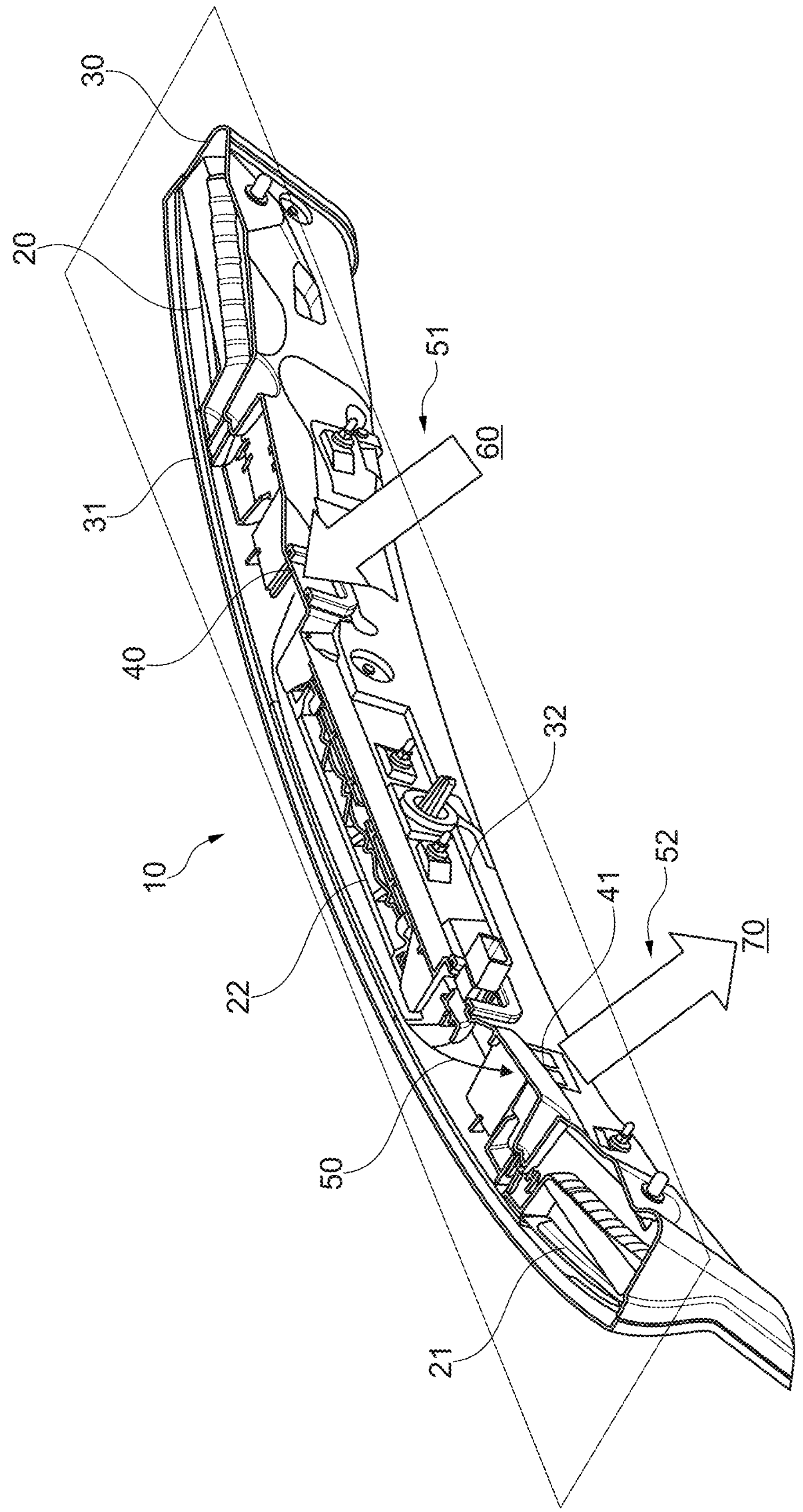
FIG. 1 shows a three-dimensional view of one embodiment of the illumination unit according to the unit from the back.

FIG. 1 shows one possible embodiment of an elongated illumination unit 10 according to the disclosure in a three-dimensional view. Here, the illumination unit 10 is shown from the back, via which it is mounted on a motor vehicle. It is, for example, a tailgate illumination unit which preferably extends over the entire tailgate of a motor vehicle, i.e. a so-called coast-to-coast illumination unit is shown here. The motor vehicle and further illumination assemblies thereon are not illustrated; however, for example, the two ends of the illumination unit 10 in the installed state are adjacent to further illumination assemblies of the motor vehicle, which can be in particular rear illuminations, for example taillights, reversing lights and/or turn signals. This is shown schematically in FIG. 2.

The illumination unit 10 has an elongated housing 30 which forms in particular the outer contour of the illumination unit 10. The housing 30 has a rear housing wall 32 which acts as a rear wall on the back. On the rear wall, the housing 30 has in particular means for electrical connection of the illumination unit 10 to the electrical system of the motor vehicle; they are, however, only shown exemplarily in the exemplary embodiment of FIG. 1. Furthermore, exemplary means for fastening the illumination unit 10 are also shown. Formed on the side opposite to the rear wall, i.e. on the front of the illumination unit 10, is an elongated light emission opening which is closed by a light-transmissive cover plate 31. The light emission opening can extend in the y-direction over the entire housing 30 and can be closed by the light-transmissive cover plate 31. The tailgate illumination unit 10 is then transparent over its entire width and can contain various light sources.

Arranged in the interior of the housing 30 are, for example, at least two illumination assemblies 20 and 21, these being respectively arranged in the end regions of the housing 30. Light emitted by the illumination assemblies is radiated rearward and is emitted from the housing 30 through the cover plate 31. Each illumination assembly 20, 21 forms, for example, a taillight, a rear fog light and/or a reversing light. These are also shown only schematically in FIG. 2.

The two end illumination assemblies 20, 21 are formed in a known manner and include, for example, one or more light-emitting diodes and a reflector as the light source. Furthermore, apertures and/or lenses may be provided in this region. Provided between the illumination assemblies 20, 21 in the rear wall of the housing 30 is at least one air inlet opening 40. Separate therefrom, an air outlet opening 41 is furthermore likewise provided between the two illumination assemblies 20, 21. The air inlet opening 40 is connected to the vehicle interior of the motor vehicle, which is identified by reference sign 60 in FIG. 1. By contrast, the air outlet opening 41 is connected to the outer area of the illumination unit 10, and the outer area is identified by reference sign 70.

Figure 2:
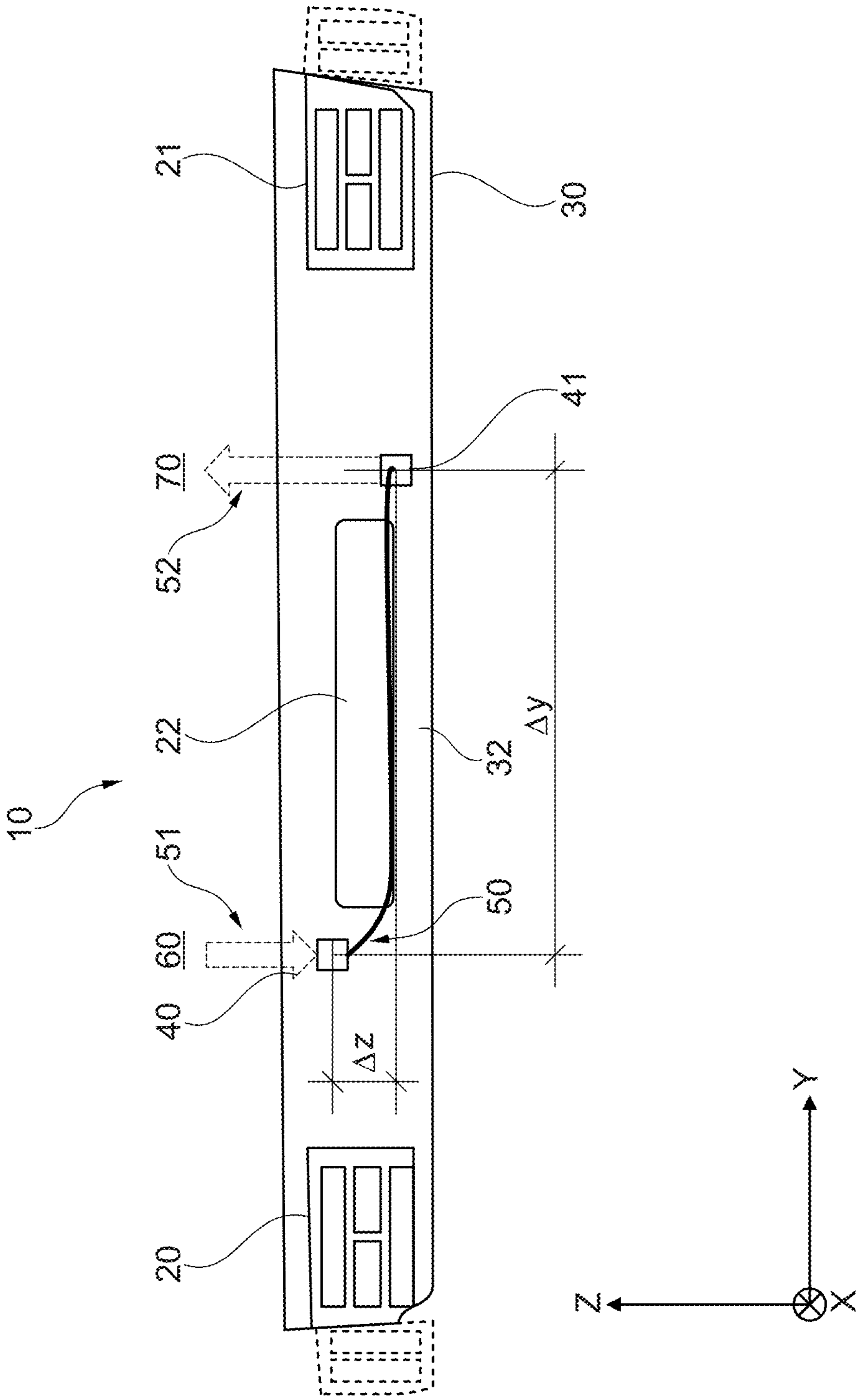
FIG. 2 shows a front view of the illumination unit according to FIG. 1.

Owing to a positive pressure in the vehicle interior 60, air, which can also be referred to as air inlet flow 51, flows through the air inlet opening 40 into the interior of the housing 30. What forms there is an air flow 50 or air circulation, which flows in particular through the central region of the housing 30 and leaves the housing again via the air outlet opening 41 and flows into the outer area 70. This air flow into the outer area 70 is also referred to as air outlet flow 52. The course of the air flow 50 is merely indicated in basic idealized form without any turbulence. Suitable guide structures not shown in the figures make it possible to achieve, by way of example, the course of the air flow 50 as shown in FIGS. 1 and 2.

The air inlet opening 40 may be connected to the vehicle interior 60 via various ducts and/or hoses in order to bring about the air inlet flow 51 owing to the positive pressure in the vehicle interior 60. The same applies to the air outlet opening 41, which for example is connected to a hose in order to guide the air outlet flow 52 at a suitable point into the outer area 70.

The positive pressure in the vehicle interior 60 may be achieved in various ways, and according to one embodiment, it is produced by operation of the motor vehicle. To this end, the windows and doors of the motor vehicle are ideally closed. The operation of an air conditioning system in the vehicle interior 60, for example, then produces the positive pressure in the vehicle interior. This has the advantage that the supplied air is also dry and heated. Alternatively, or additionally, forward motion of the motor vehicle also produces the positive pressure. The positive pressure causes a pressure difference between vehicle interior 60 and outer area 70 that leads to the aforementioned air flows. To this end, there is no need to provide further components such as fans, blowers, heaters, etc., in order to convey air into the housing 30; instead, the air circulation occurs automatically.

In one embodiment of the disclosure, at least one further illumination assembly 22 is provided in the central region of the illumination unit 10. This is, for example, an LED light band, illuminated lettering or some other light element provided within the illumination unit 10 for illumination reasons. The illumination assembly 22 lies between the two openings 40 and 41, and the supplied air particularly effectively demists the cover plate 31 in this region as well, in the event of fogging of the cover plate 31. But also possible fogging in the region of the end illumination assemblies 20 and 21 is effectively prevented or dispersed by the generated air circulation, since the supplied air flow brings about an air circulation right into the regions, though this is not shown in the figures.

In order to prevent or disperse fogging as effectively as possible, what is therefore realized is an air circulation that is as extensive as possible. The openings 40 and 41 are suitably designed and arranged for this purpose.

FIG. 2 shows schematically, for example, the front of an illumination unit 10 having the two illumination assemblies 20 and 21 on the left and right of the drawing plane. The illumination assemblies 20, 21 in the installed state are adjacent to further illumination assemblies of the motor vehicle, which are however shown only in dashed form in FIG. 2 in order to illustrate their position. FIG. 2 is a schematic view through the cover plate 31 to the rear wall of the housing 30, formed in which are the air inlet opening 40 and, separate therefrom, the air outlet opening 41. The openings lie between the two illumination assemblies 20 and 21, and the distance Δy between them in the y-direction of the motor vehicle is chosen as greatly as possible, but with account being taken of the other fittings in the housing 30. The distance is thus maximal taking into account these other components, i.e. if further components are required between the two illumination assemblies 20, 21, the former are suitably positioned and the remaining space is used to arrange the openings 40 and 41 at the greatest possible distance Δy to each other. The same applies to a height difference Δz between the two openings 40 and 41 in the z-direction. The indicated directions correspond to the customary vehicle coordinate system x, y, z.

FIG. 2 also shows the basic course of a resultant air flow 50 within the housing 30. Although it does not flow directly along the illumination assemblies 20 and 21, it does generate an air circulation throughout the housing 30 that is capable of also removing fogging from the two illumination assemblies 20, 21 or preventing fogging thereof. Furthermore, a possible central illumination assembly 22 is indicated, in the region of which fogging can also be prevented or dispersed.

Figure 3:
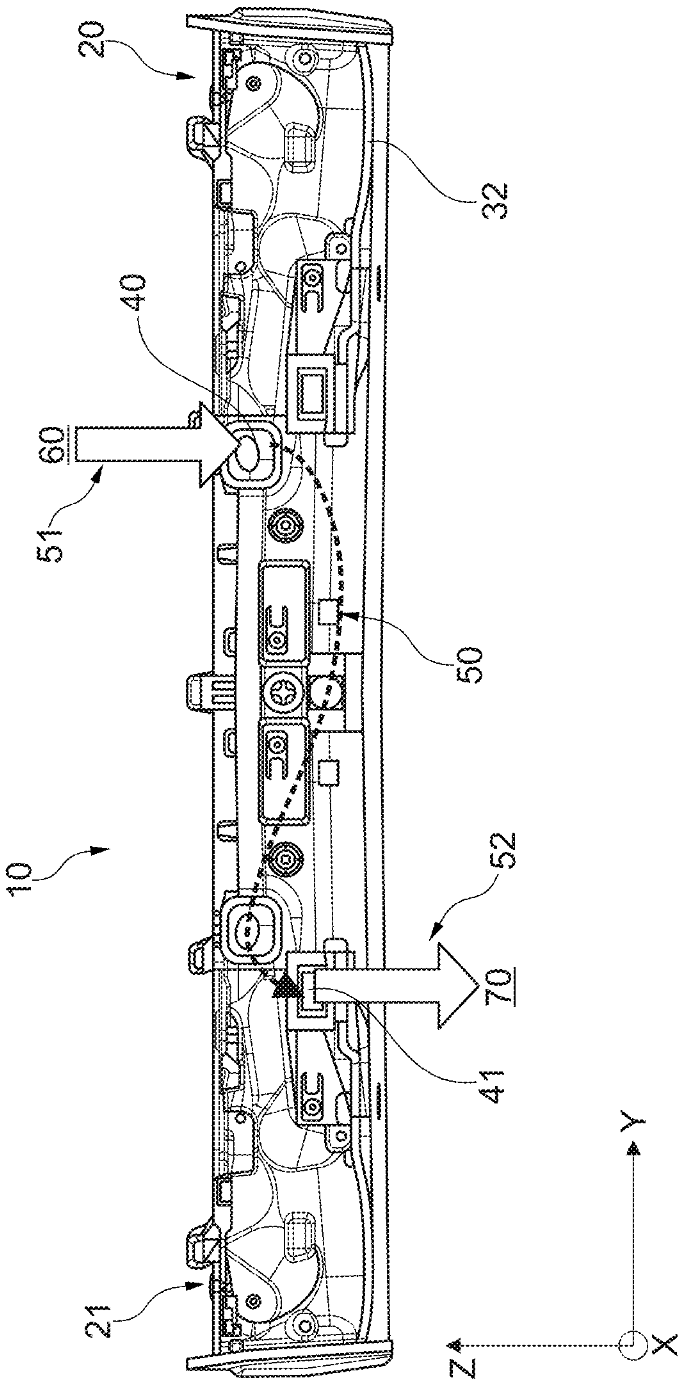
FIG. 3 shows a rear view of the illumination unit according to FIG. 1.

FIG. 3 shows the illumination unit 10 again from the back, which is mounted on the motor vehicle. What can be seen again is the rear housing wall 32, i.e. the rear wall having the air inlet opening 40, which is at a higher level in relation to the air outlet opening 41, and the lower-level air outlet opening 41. On this side, the air inlet flow 51 and the air outlet flow 52 also enter and exit through the openings in the rear wall of the housing 30, the air flow 50 coursing within the housing 30 being shown in the form of dashes. As can be seen, the course of the air flow 50 shown in the form of dashes in FIG. 3 is different from that in FIGS. 1 and 2, and this is achievable by corresponding guide structures.

Ventilation elements having membranes, which are not shown, may be arranged at the air inlet opening 40 and at the air outlet opening 41, and they allow a continuous air flow, but prevent or reduce the ingress of moisture and dirt. The ventilation elements having membranes are ideally sufficiently permeable for the pressure difference to suffice for an automatic air circulation.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

LIST OF REFERENCE SIGNS

10 Illumination unit
20,21 Illumination assembly, end
22 Illumination assembly, central
30 Housing
31 Cover plate
32 Housing wall, rear wall
40 Air inlet opening
41 Air outlet opening
50 Air circulation, air flow
51 Air inlet flow
52 Air outlet flow
60 Vehicle interior
70 Outer area
x,y,z Vehicle coordinate system
Δz Height difference
Δy Distance

The invention claimed is:

1. An illumination unit for a motor vehicle, comprising:

a housing including a first end region having a first illumination assembly and a second end region having a second illumination assembly;

an air inlet opening formed in a rear housing wall of the housing between the first illumination assembly and the second illumination assembly; and an air outlet opening formed in the rear housing wall of the housing between the first illumination assembly and the second illumination assembly, wherein the air inlet opening is connected to a vehicle interior of the motor vehicle and the air outlet opening is connected to an outer area of the motor vehicle, thereby establishing an automatic air circulation achieved by a pressure difference between the vehicle interior and the outer area.

2. The illumination unit as recited in claim 1, wherein the housing includes a light emission opening closed by a light-transmissive cover plate, and further wherein the first illumination assembly and the second illumination assembly are configured to emit light through the light-transmissive cover plate.

3. The illumination unit as recited in claim 2, wherein the light-transmissive cover plate is located on an opposite side of the housing from the rear housing wall.

4. The illumination unit as recited in claim 1, wherein the illumination unit is an elongated illumination unit that is mounted to a tailgate of the motor vehicle.

5. The illumination unit as recited in claim 4, wherein the elongated illumination unit is a coast-to-coast illumination unit that extends over an entire width of the tailgate.

6. The illumination unit as recited in claim 1, wherein the pressure difference between the vehicle interior and the outer area of the motor vehicle is achieved by an operation of an air conditioning system of the motor vehicle and/or a forward motion of the motor vehicle.

7. The illumination unit as recited in claim 6, wherein the pressure difference is at least 20 Pa.

8. The illumination unit as recited in claim 1, wherein the air inlet opening and the air outlet opening are vertically offset in a Z-direction of the motor vehicle, and further wherein the air inlet opening is vertically higher than the air outlet opening in the Z-direction of the motor vehicle.

9. The illumination unit as recited in claim 1, comprising a ventilation element disposed within each of the air inlet opening and the air outlet opening.

10. The illumination unit as recited in claim 1, wherein the first end region is located adjacent to a first taillight of the motor vehicle, and the second end region is located adjacent to a second taillight of the motor vehicle.

11. The illumination unit as recited in claim 1, wherein the first illumination assembly and the second illumination assembly are each configured to function as a taillight, a rear fog light, and/or a reversing light.

12. An illumination unit for a motor vehicle, comprising:

a housing including a first end region having a first illumination assembly and a second end region having a second illumination assembly;

an air inlet opening formed in a rear housing wall of the housing between the first illumination assembly and the second illumination assembly;

an air outlet opening formed in the rear housing wall of the housing between the first illumination assembly and the second illumination assembly, wherein the air inlet opening is connected to a vehicle interior of the motor vehicle and the air outlet opening is connected to an outer area of the motor vehicle, thereby establishing an automatic air circulation achieved by a pressure difference between the vehicle interior and the outer area; and a third illumination assembly arranged within the housing between the first illumination assembly and the second illumination assembly.

13. The illumination unit as recited in claim 12, wherein the automatic air circulation extends past the third illumination assembly.

14. The illumination unit as recited in claim 12, wherein the third illumination assembly is located between the air inlet opening and the air outlet opening.

15. The illumination unit as recited in claim 12, wherein the third illumination assembly includes an LED light band and/or an illuminated lettering.

16. An illumination unit for a motor vehicle, comprising:

a tailgate;

an elongated illumination housing mounted to the tailgate and including a first illumination assembly and a second illumination assembly;

an air inlet opening formed in a rear housing wall of the elongated illumination housing at a location between the first illumination assembly and the second illumination assembly; and an air outlet opening formed in the rear housing wall at a location between the first illumination assembly and the second illumination assembly.

17. The illumination unit as recited in claim 16, wherein the air inlet opening is connected to a vehicle interior of the motor vehicle and the air outlet opening is connected to an outer area of the motor vehicle, thereby establishing an automatic air circulation achieved by a pressure difference between the vehicle interior and the outer area.

18. The illumination unit as recited in claim 17, comprising a third illumination assembly arranged within the elongated illumination housing between the first illumination assembly and the second illumination assembly, wherein the automatic air circulation extends past the third illumination assembly.

19. The illumination unit as recited in claim 16, wherein the elongated illumination housing extends across an entire width of the tailgate.

20. The illumination unit as recited in claim 16, wherein a first end region of the elongated illumination housing is located adjacent to a first taillight of the motor vehicle, and a second end region of the elongated illumination housing is located adjacent to a second taillight of the motor vehicle.

* * * * *